US008129014B2

(12) United States Patent
Nakamura et al.

(10) Patent No.: US 8,129,014 B2
(45) Date of Patent: Mar. 6, 2012

(54) DEVELOPING BLADE AND ITS MANUFACTURING METHOD

(75) Inventors: Hiroshi Nakamura, Takayama (JP); Junji Tsuboi, Shinagawa-ku (JP); Shinji Souma, Shinagawa-ku (JP)

(73) Assignee: Fujikura Rubber Ltd., Tokyo (JP)

( * ) Notice: Subject to any disclaimer, the term of this patent is extended or adjusted under 35 U.S.C. 154(b) by 1080 days.

(21) Appl. No.: 11/952,604

(22) Filed: Dec. 7, 2007

(65) Prior Publication Data

US 2008/0145662 A1 Jun. 19, 2008

(30) Foreign Application Priority Data

Dec. 15, 2006 (JP) ................................ 2006-337801
Mar. 12, 2007 (JP) ................................ 2007-061458

(51) Int. Cl.
*B32B 7/02* (2006.01)

(52) U.S. Cl. ........ 428/212; 428/141; 428/220; 399/274; 399/284

(58) Field of Classification Search .................. 428/141, 428/212, 220; 399/274, 284
See application file for complete search history.

(56) References Cited

U.S. PATENT DOCUMENTS 5,185,496 A * 2/1993 Nishimura et al. ........... 399/275
2003/0223783 A1* 12/2003 Yamamoto et al. ........... 399/284

FOREIGN PATENT DOCUMENTS

JP 2004-163615 * 6/2004

OTHER PUBLICATIONS

Goto, JP 2004-163615 machine translation, Jun. 10, 2004.*
U.S. Appl. No. 12/278,850, filed Aug. 8, 2008, Nakamura, et al.
U.S. Appl. No. 12/281,150, filed Aug. 29, 2008, Souma, et al.
The Center for Advanced Friction Studies is an NSF, State of Illinois, Industrial & University Cooperative Research Facility; Surfaces and Contact Mechanics, Center for Advanced Friction Studies, Southern Illinois University. pp. 1-11. http://frictioncenter.engr.siu.edu/course/file10.html.

* cited by examiner

*Primary Examiner* — David Sample
*Assistant Examiner* — Lawrence Ferguson
(74) *Attorney, Agent, or Firm* — Oblon, Spivak, McClelland, Maier & Neustadt, L.L.P.

(57) ABSTRACT

A developing blade (11) comprises a blade member (14) located along one side edge of a support member (12) and having a surface shape defined by a maximum height roughness Ry of 0.35 to 4.5 μm and a length ratio under load tp (at a 30% cut level) of 15% or less. Such a developing blade is manufactured by bringing a top mold (2) having a mold surface (2A) with a cavity (4) formed for the formation of a blade member and a gate (6) in communication with the cavity (4) in alignment with a bottom mold (3) having a flat mold surface (3A) such that at least a part of the support member (12) is positioned in the cavity (4), clamping together both the top and bottom molds, and pouring a molding material from the gate (6) to fill in the cavity (4).

6 Claims, 15 Drawing Sheets

FIG. 14A
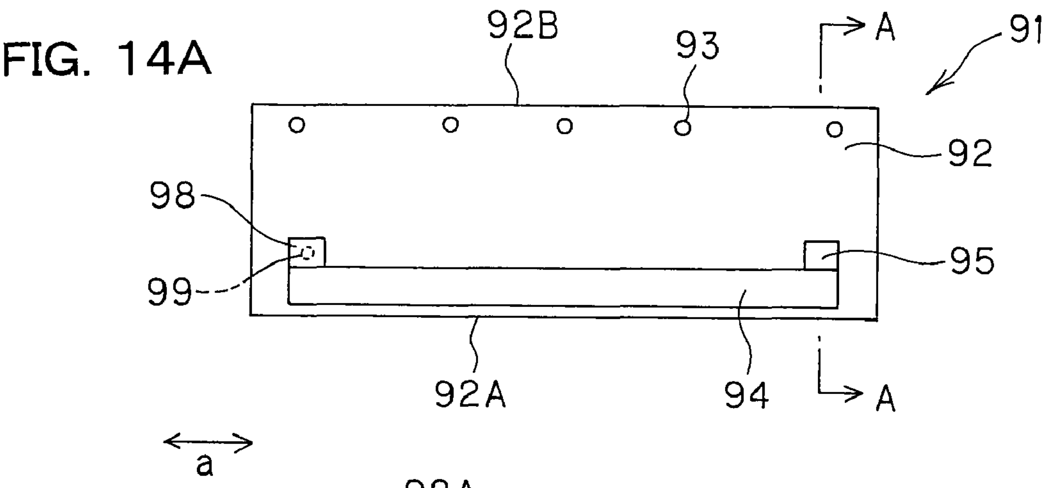
FIG. 14B
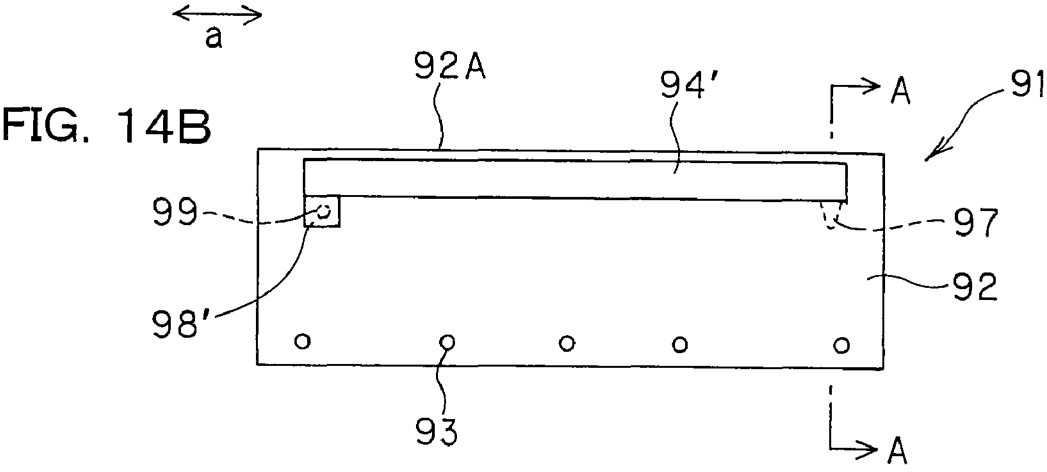
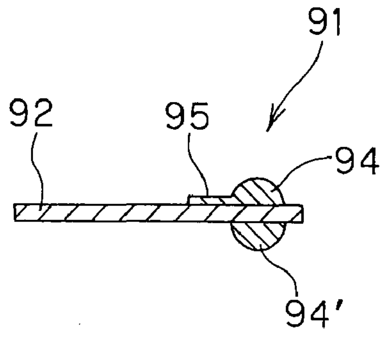
FIG. 15

FIG. 18A
FIG. 18B
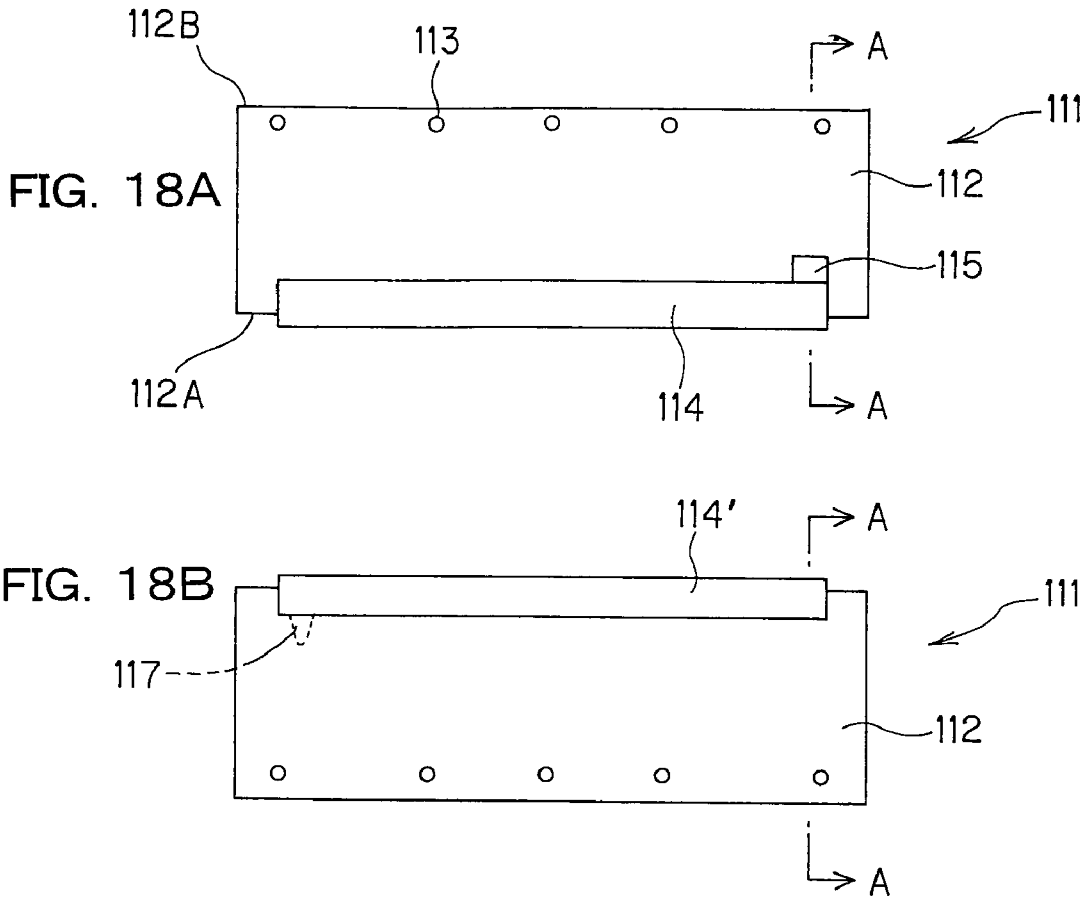
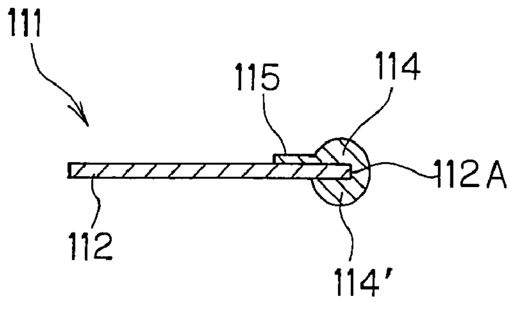
FIG. 19

DEVELOPING BLADE AND ITS MANUFACTURING METHOD

TECHNICAL ART

The present invention relates generally to a developing blade and it's manufacturing method, and more specifically to a developing blade used with developer equipment for electrophotographic imagers such as high-speed laser printers, copiers and facsimiles, and its manufacturing method.

BACKGROUND ART

An imager making use of an electrophotographic imaging process comprises developer equipment for developing latent images on a photosensitive drum. For this developer, as shown typically in FIG. 20, there is a developer 201 known so far in the art, which is of the structure that comprises a hopper 202, a developing roller 203, a rotatable agitator 204 and a developing blade 205 (JP(A)2003-43812). With this developer 201, a toner 206 in the hopper 202 is fed by the agitator 204 to the developing roller 203 so that the toner in thin layer form is uniformly carried on the peripheral surface of the developing roller 203 by frictional electrification between the developing blade 205 and the developing roller 203. And then, the toner 206 passes from the developing roller 203 onto the photosensitive drum 207 with a latent image formed on it for development.

As shown typically in FIG. 21, the developing blade 205 known so far in the art is of the structure that comprises a rubber blade member 214 along the side edge 212A of a metallic support member 212 having a thickness of about 0.1 mm.

Now that the developing roller 203 rotates at a high speed (of 24 rpm or more for instance) so as to cope with faster operation of the electrophotographic imagers such as laser printers, however, problems with the prior art developing blade are that the resulting images are likely to be poor in density, and streak as well.

DISCLOSURE OF THE INVENTION

An object of the invention is to provide a developing blade capable of adapting to faster operation of electrophotographic imagers, and a method for manufacturing such a developing blade.

According to the invention, that object is achievable by the provision of a developing blade comprising a support member and a blade member located along one side edge of said support member, wherein said blade member has a surface shape defined by a maximum height roughness Ry of 0.35 to 4.5 μm and a length ratio under load $t_p$ (at a 30% cut level) of 15% or less.

In an embodiment of the invention, said side edge of said support member is covered with said blade member except both ends thereof.

In another embodiment of the invention, said blade member is located on each surface of said support member.

With such an inventive developing blade as mentioned above wherein the blade member has a maximum height roughness Ry of 0.35 to 4.5 μm and a length ratio under load $t_p$ (at a 30% cut level) of 15% or less, it is possible to hold back an increase in its frictional resistance to the developing roller and allow the toner to be full electrified so that the toner in thin layer form is uniformly carried on the peripheral surface of the developing roller, even when that developing roller rotates at high speeds (of 24 rpm or more, for instance). This could adapt well to faster operation of electrophotographic imagers.

The invention also provides a method for manufacturing a developing blade including a blade member located along one side edge of a support member, wherein a top mold comprising a mold surface with a cavity formed for formation of a blade member and a gate in communication with said cavity, wherein said cavity is sandblasted with an abrasive in a range of #150 to #1000, and a bottom mold having a flat mold surface are used, both molds are clamped together while said top mold is brought in alignment with said bottom mold such that at least a part of said support member is positioned in said cavity, and a molding material is poured from said gate to fill in said cavity.

Moreover, the invention provides a method for manufacturing a developing blade including a blade member located on each surface of a support member along one side edge of said support member, wherein a top mold comprising a mold surface with a cavity formed for the formation of a blade member and a gate in communication with said cavity, wherein said cavity is sandblasted with an abrasive in a range of #150 to #1000, and a bottom mold provided with a mold surface with a cavity formed for the formation of a blade member, wherein said cavity is sandblasted with an abrasive in a range of #150 to #1000, are used; both molds are clamped together while said top mold is brought in alignment with said bottom mold such that said cavities oppose each other with said support member therebetween; and a molding material is poured from said gate to fill in said cavities.

In an embodiment of the manufacturing method of the invention, said sandblasting is carried out using a pressurized blasting apparatus, and a ceramic abrasive is used for said abrasive.

In another embodiment of the manufacturing method of the invention, said cavity has a wall surface curved and recessed at the deepest site.

In a further embodiment of the manufacturing method of the invention, said molding material is a liquid silicone rubber/curing agent mixture.

With such an inventive manufacturing method as mentioned above wherein the cavity is sandblasted under given conditions so that the blade member of the obtained developing blade has a surface shape defined by a fine asperity pattern on which the surface shape of each cavity is reflected, i.e., a maximum height roughness Ry of 0.35 to 4.5 μm and a length ratio under load $t_p$ (at a 30% cut level) of 15% or less, it is possible to hold back an increase in its frictional resistance to the developing roller and allow the toner to be full electrified so that the toner in thin layer form is uniformly carried on the peripheral surface of the developing roller, even when that developing roller rotates at high speeds (of 24 rpm or more, for instance). This could adapt well to faster operation of electrophotographic imagers.

BRIEF DESCRIPTION OF THE DRAWINGS

FIG. 2 is illustrative in section of a bottom mold being clamped together with the top mold of FIG. 1.

FIG. 14 is illustrative of a further embodiment of the developing blade according to the invention; FIG. 14A is a front view and FIG. 14B is a back view.

FIG. 15 is a sectional view of the developing blade of FIG. 14 as taken on line A-A.

FIG. 18 is illustrative of a further embodiment of the developing blade according to the invention; FIG. 18A is a front view and FIG. 18B is a back view.

FIG. 19 is a sectional view of the developing blade of FIG. 18 as taken on line A-A.

BEST MODE FOR CARRYING OUT THE INVENTION

Embodiments of the invention are now explained with reference to the drawings.

First Embodiment (Manufacturing Method)

Figure 1:
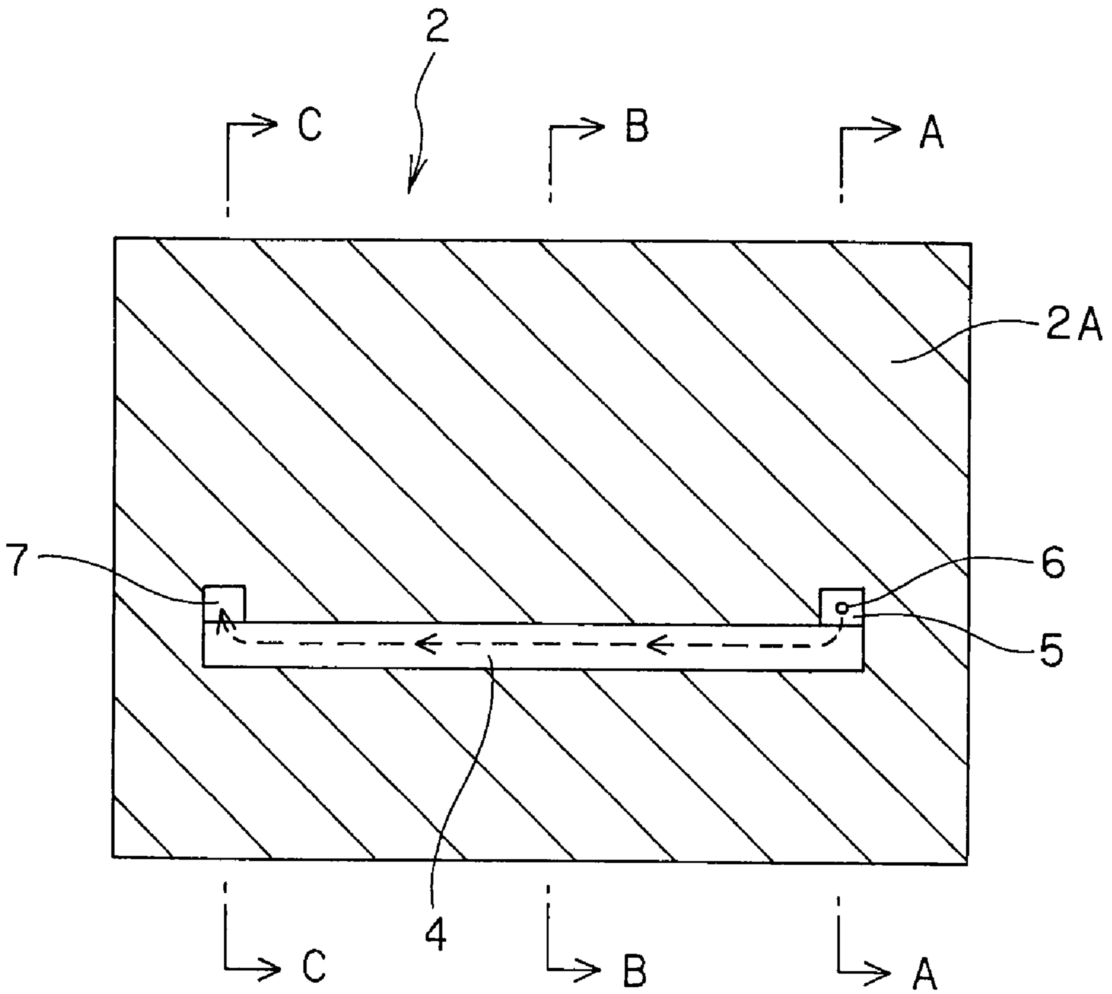
FIG. 1 is a plan view of one exemplary top mold used with the developing blade manufacturing method of the invention.
Figure 2A:
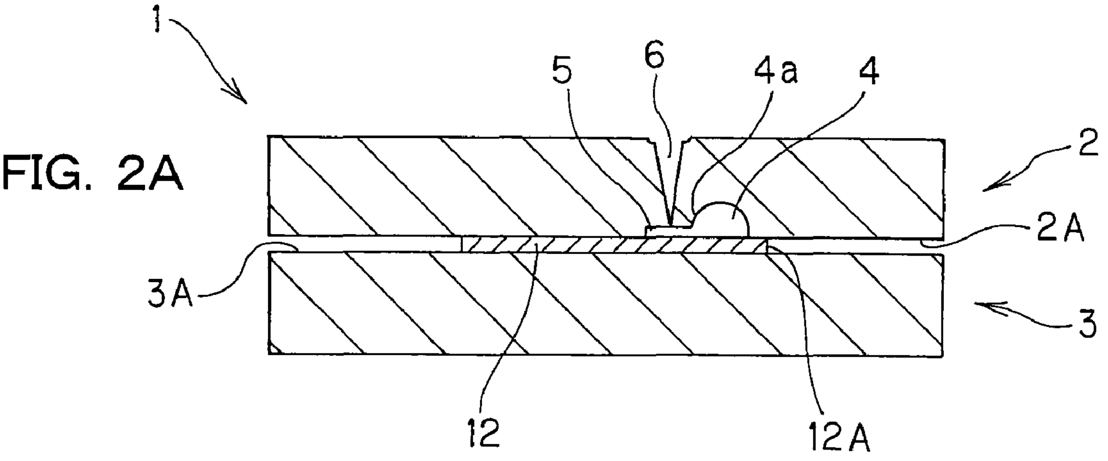
FIG. 2A is a sectional view as taken on line A-A of FIG. 1.
Figure 2B:
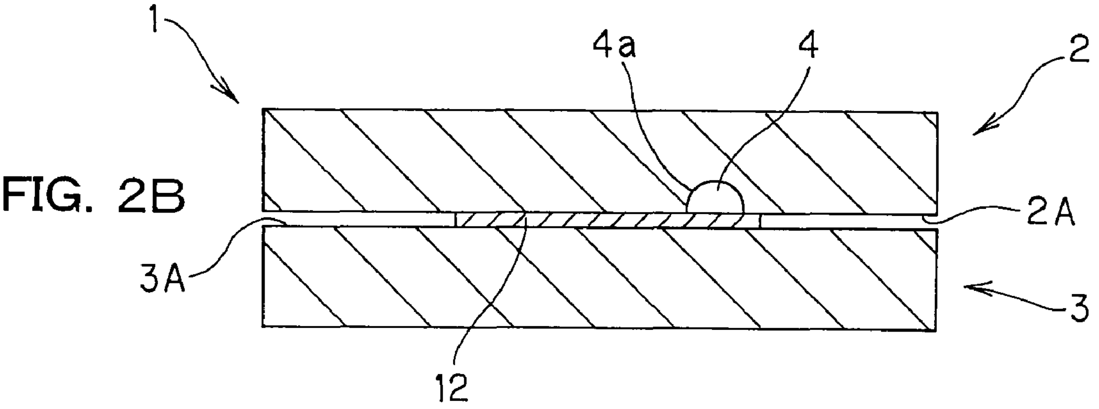
FIG. 2B is a sectional view as taken on line B-B of FIG. 1.
Figure 2C:
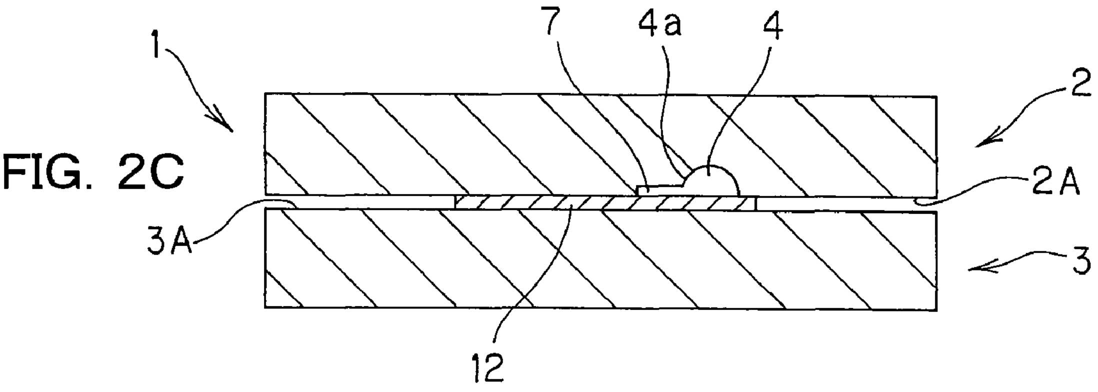
FIG. 2C is a sectional view as taken on line C-C of FIG. 1.

FIG. 1 is a plan view of one exemplary top mold used with the developing blade manufacturing method of the invention. FIG. 2 is illustrative in section of a bottom mold being clamped together with the top mold of FIG. 1; FIG. 2A is a sectional view as taken on line A-A of FIG. 1, FIG. 2B is a sectional view as taken on line B-B of FIG. 1, and FIG. 2C is a sectional view as taken on line C-C of FIG. 1.

Referring to FIG. 1 and FIGS. 2A, 2B and 2C, a mold assembly 1 used herein is built up of a top mold 2 and a bottom mold 3. The top mold 2 comprises a mold surface 2A (the plane hatched in FIG. 1) with a cavity 4 formed in it for the formation of a blade member, an inlet port 5 formed in a back surface 4*a* of the cavity 4 on one end side in the lengthwise direction of the cavity 4 (the direction indicated by an arrow a in FIG. 1), one gate 6 positioned at the inlet port 5, and a reservoir 7 formed in the back surface 4*a* of the cavity 4 on the other end side in the lengthwise direction. The deepest portion of the cavity 4 (the deepest site as viewed from the mold surface 2A of the top mold 2) is curved and recessed, while the bottom mold 3 has a flat mold surface 3A.

It is noted that the inlet port 5 and reservoir 7 may be reversed in position in the lengthwise direction, and that the depths, widths (in the lengthwise direction of the cavity 4) and lengths (in a direction orthogonal to the lengthwise direction of the cavity 4) of the inlet port 5 and reservoir 7 may be determined as desired.

The top mold 2 used herein has the cavity 4 sand-blasted with an abrasive in the range of #150 to #1,000. As the abrasive used for sandblasting has a fine grain size exceeding #1,000, it may cause the area of contact of the blade member of the ensuing developing blade with a developing roller to grow too large for the smooth rotation of the developing roller due to frictional resistance between both, and the developing blade and developing roller to skid off, failing to produce good images. As the abrasive has a coarse grain size short of #150, on the other hand, it may cause the area of contact of the blade member of the ensuing developing blade with a developing roller to become small, rendering it difficult to bring about sufficient electrification of the toner due to a decreased friction between both and, hence, making the density of the resultant image low. Another problem is that fine asperities on the blade member of the developing blade may be scraped down, entering the toner in the form of foreign matters.

The abrasive material used for sandblasting is preferably a ceramic material exemplified by silicon carbide (available in the trade name of Carborundum, etc.), alundum, and emery. Sandblasting may be carried out using pressurized blasting apparatus, vacuum blasting apparatus, wet blasting apparatus, ultra-pressurized water jet blasting apparatus, centrifugal blasting apparatus, etc., although particular preference is given to the pressurized blasting apparatus. Referring to blasting conditions, for instance, a pressure of 1 to 10 kg/cm$^2$ may be applied while the distance between the apparatus and the member to be sandblasted (the cavity 4 in the top mold 2) may be set at 50 to 200 mm and the blasting angle of the abrasive with the member to be sandblasted (the angle of the abrasive with the flat mold surface 2A of the top mold 2) may be set at 90°±20°, as desired. More specific conditions are a pressure of 4 kg/cm$^2$, a distance of 100 mm and an angle of 90°.

The top mold 2 and the bottom mold 3 in alignment are clamped together such that the cavity 4 is closed up with a support member 12. The top mold 2 and the bottom mold 3 are clamped together at a pressure of, for instance, 0.5 to 3 MPa per cavity.

Thereafter, a molding material is pored from a gate 6, and flows through the cavity 4 along a flow line indicated by a chain line in FIG. 1, flowing over it and arriving at the reservoir 7. And the surface state of the sandblasted cavity 4 is reflected on the molding material filling in the cavity 4, whereby the blade member is formed on the support member 12, yielding the developing blade. The surface state of the blade member of the ensuing developing blade is going to have a fine asperity pattern on which the surface state of the sandblasted cavity 4 is reflected.

The molding material used herein, for instance, includes silicone rubber, nitrile rubber, fluororubber, urethane rubber, epichlorohydrin rubber, hydrogenated nitrile rubber, among which the silicone rubber is most preferred. There is the more specific mention of a mixture of liquid silicone rubber and a curing agent, and LR3303 (made by Asashi Kasei Wacker Co., Ltd.).

It is here noted that the flow of the molding material through such cavity 4 as mentioned above is good enough to prevent the occurrence of sink marks and weld marks, and that even when there are air bubbles in the molding material, it is possible to form an intimate blade member of uniform thickness and without air bubbles, because such air bubbles are collected in the overflowing reservoir 7 for degassing.

(Developing Blade)

Figure 3:
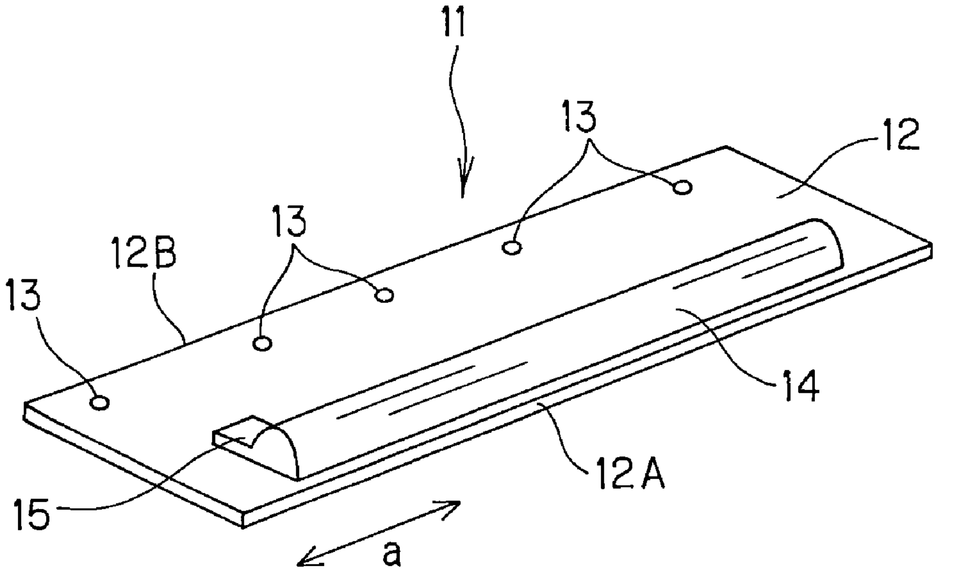
FIG. 3 is a perspective view of one embodiment of the developing blade according to the invention.
Figure 4:
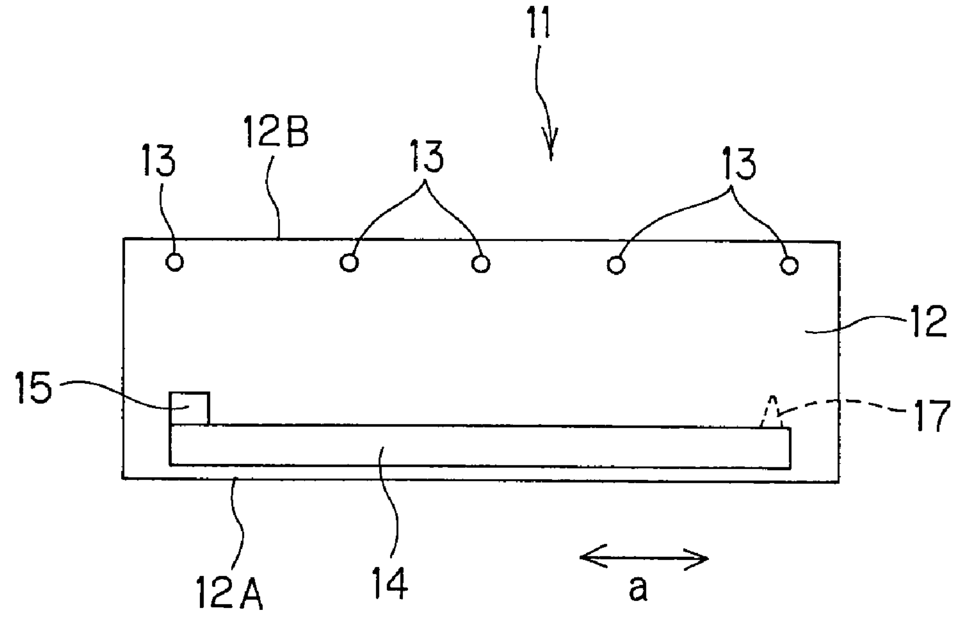
FIG. 4 is a plan view of the developing blade shown in FIG. 3.

FIG. 3 is a perspective view of one embodiment of the developing blade according to the invention, and FIG. 4 is a plan view of the developing blade depicted in FIG. 3. As shown in FIGS. 3 and 4, a developing blade 11 comprises a support member 12 and a blade member 14 formed along one side edge 12A of the support member 12. The area of contact of the blade member 14 with the developing roller defines a curved surface.

The surface shape of the blade member 14 of the developing blade 11 according to the invention is a fine asperity pattern having a maximum height roughness Ry of 0.35 to 4.5 μm, preferably 0.35 to 4.0 μm, and a length ratio under load $t_p$ (at a 30% cut level) of 15% or lower, preferably 12% or lower. With the inventive developing blade 11 comprising such blade member 14, it is possible to hold back an increase in its frictional resistance to the developing roller and allow the toner to be full electrified so that the toner in thin layer form is uniformly carried on the peripheral surface of the developing roller, even when that developing roller rotates at high speeds (of 24 rpm or more, for instance).

The maximum height roughness Ry here is defined by the sum of the maximum value of a peak height Rp and the maximum value of a valley height Rv of a roughness curve and, in the invention, that is measured with a surface roughness apparatus (Surfcom 2800E made by Tokyo Seimitsu Co., Ltd.). The same will apply hereinafter.

The length ratio under load $t_p$ (at a 30% cut level) is defined by a ratio (in percentage) of the sum of horizontal lengths (length under load $\eta_p$) to a reference length. The sum of horizontal lengths is obtained when only the reference length (0.8 mm) is extracted out of the roughness curve in the direction of its average line and a roughness curve for the extract is cut at a cut level (30% of Ry) parallel with a peak line and, in the invention, that is measured with a surface roughness gauge (Surfcom 2800E made by Tokyo Seimitsu Co., Ltd.). The same will apply hereinafter.

There is no particular limitation imposed on the material of the support member 12 forming a part of the developing blade 11 of the invention; for instance, specific reference is made to a metal substrate such as one made up of stainless steel, e.g., SUS301 and SUS304, and phosphor bronze for springs, e.g., C5210, a ceramics substrate, a resin substrate such as one made up of PC (polycarbonate), and PBT (polybutylene terephthalate). The thickness of the support member 12 is, for instance, approximately 1 mm in case of stainless steel. The support member 12 also comprises a plurality of holes 13 along the side edge 12B opposite to the side edge 12A. Such holes 13 may optionally be used for mounting, alignment or the like; they are never limited to what is illustrated in the drawings.

The material of the blade member 14 that forms a part of the developing blade 11, for instance, includes silicone rubber, nitrile rubber, flurorubber, urethane rubber, epichlorohydrin rubber, hydrogenated nitrile rubber, among which the silicone rubber is most preferred.

Such inventive developing blade 11 may be manufactured by the inventive manufacturing method using the aforesaid top mold 2 and bottom mold 3. By manufacturing the developing blade 11 with the aforesaid inventive manufacturing method, the blade member 14 has on its surface a fine asperity pattern on which the surface state of the sandblasted cavity 4 is reflected. That fine asperity pattern has a maximum height roughness Ry of 0.35 to 4.5 μm and a length ratio under load $t_p$ (at a 30% cut level) of 15% or lower.

Figure 5:
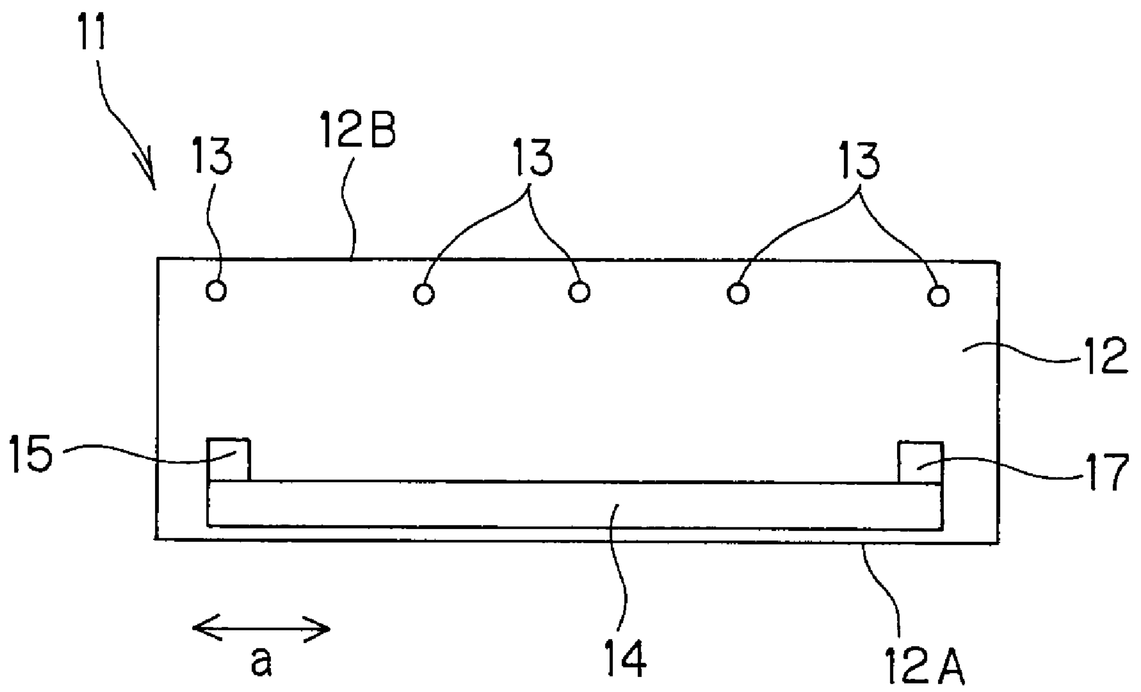
FIG. 5 is a perspective view of another embodiment of the developing blade according to the invention.

It is here noted that there is a skirt 15 extending from near one end of the blade member 14 in the lengthwise direction (the direction indicated by arrows a in FIGS. 3 and 4). That skirt 15 is a site formed by the inlet port 5 at which the gate 6 is positioned in the aforesaid top mold 2. In the reservoir 7 in the aforesaid top mold 2, on the other hand, the molding material that flows over the cavity 4 remains stayed, for instance, forming such projection 17 as indicated by a two-dot (phantom) line in FIG. 4. This projection 17 is removed from what is illustrated in FIG. 4. Alternatively, the molding material that flows over the cavity 4 may remain stayed in the reservoir 7, allowing the projection 17 having a shape conforming to the reservoir 7 to remain in the developing blade 11, as shown in FIG. 5.

Second Embodiment (Manufacturing Method)

Figure 6:
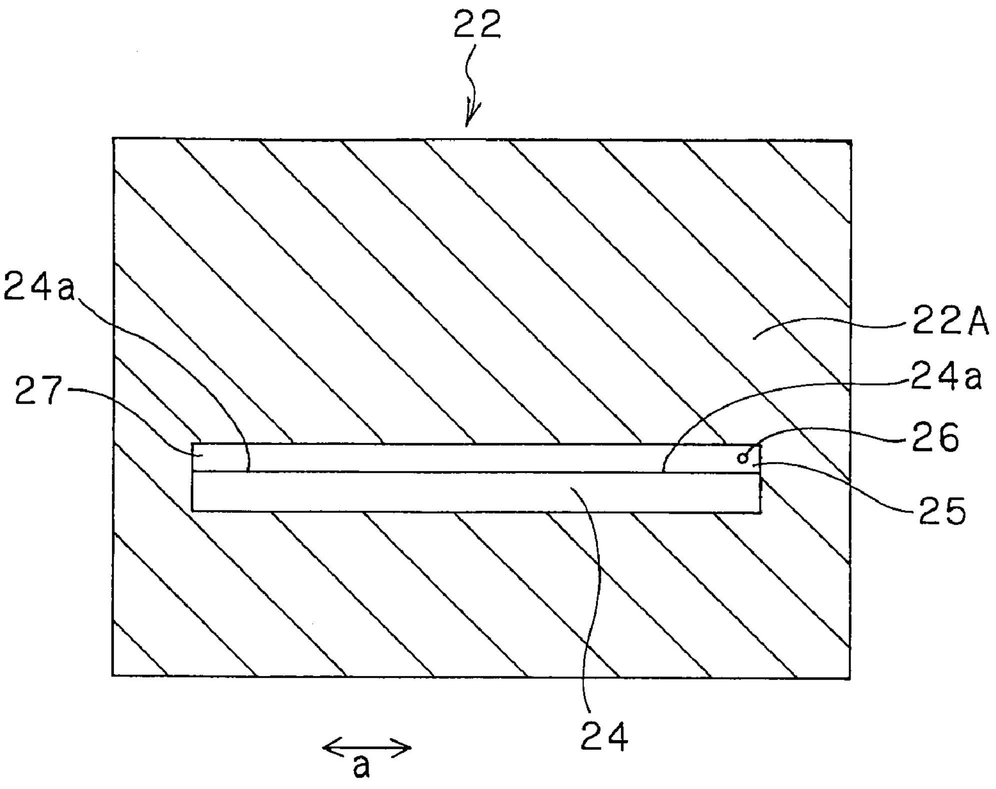
FIG. 6 is a plan view of another example of the top mold used with the developing blade manufacturing method according to the invention.

FIG. 6 is a plan view of another example of the top mold used with the method of manufacturing the inventive developing blade. The method of manufacturing the inventive developing blade is never limited to the aforesaid embodiment wherein the inlet port and the reservoir are independently provided in the top mold. In the embodiment shown in FIG. 6, a top mold 22 comprises a cavity 24 for a semicircular shape in section adapted to form a blade member, a combined inlet port and reservoir 25 extending on the back surface side 24*a* of the cavity 24 along the lengthwise direction (the direction indicated by an arrow a in FIG. 6) of the cavity 24, and a gate 26 positioned at one end of the combined inlet port and reservoir 25. And the site of the combined inlet port and reservoir 25 that is opposite to the side with the gate 26 positioned on it defines a reservoir 27; there is the structure provided in which the inlet port and the reservoir are not independent. In this case, too, the aforesaid cavity 24 is sandblasted with an abrasive in the range of #150 to #1000. This sandblasting may be applied to the combined inlet port and reservoir 25, too. Note here that the site hatched in FIG. 6 stands for a flat mold surface 22A.

As in FIG. 2, such top mold 22 and the aforesaid bottom mold 3 in alignment are clamped together such that the cavity 24 is closed up with a support member. The pressure for clamping together the top mold 22 and the bottom mold 3 may be set in the range of, for instance, 0.5 to 3 MPa per cavity.

Thereafter, the molding material is poured from the gate 26 so that it flows through, and fills in, the cavity 24. And the surface state of the sandblasted cavity 24 is reflected on the molding material filling in the cavity 24, whereby the blade member is formed on the support member, yielding the developing blade. The surface state of the blade member of the ensuing developing blade is going to have a fine asperity pattern on which the surface state of the sandblasted cavity 24 is reflected.

The molding material used herein may be the same as mentioned in conjunction with the aforesaid manufacturing method.

(Developing Blade)

Figure 7:
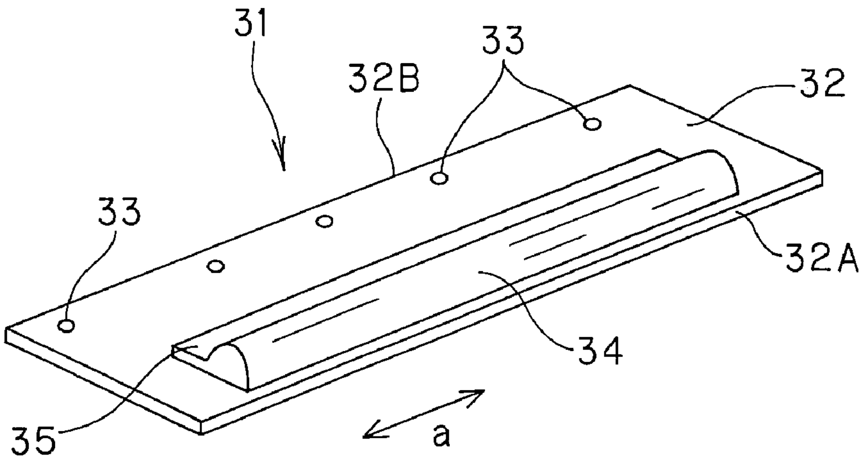
FIG. 7 is a perspective view of another embodiment of the developing blade according to the invention.

FIG. 7 is a perspective view of another embodiment of the developing blade according to the invention. As shown in FIG. 7, a developing blade 31 comprises a support member 32, a blade member 34 formed along one side edge 32A of the support member 32, and a skirt 35 running contiguous to and along the blade member 34 in the lengthwise direction (the direction indicated by an arrow a) of the blade member 34. The area of contact of the blade member 34 with the developing roller defines a curved surface.

The surface shape of the blade member 34 of the developing blade 31 according to the invention is a fine asperity pattern having a maximum height roughness Ry of 0.35 to 4.5 μm, preferably 0.35 to 4.0 μm, and a length ratio under load $t_p$ (at a 30% cut level) of 15% or lower, preferably 12% or lower. With the inventive developing blade 31 comprising such blade member 34, it is possible to hold back an increase in its frictional resistance to the developing roller and allow the toner to be full electrified so that the toner in thin layer form is uniformly carried on the peripheral surface of the developing roller, even when that developing roller rotates at high speeds (of 24 rpm or more, for instance).

The material of the blade member 34 forming a part of the developing blade 31 according to the invention may be the same as that of the blade member 14 forming a part of the aforesaid developing bladed 11.

Such inventive developing blade 31 may be manufactured by the inventive manufacturing method using the aforesaid top mold 22 and the bottom mold 3. By manufacturing the developing blade 31 with the aforesaid inventive manufacturing method, the blade member 34 has on its surface a fine asperity pattern on which the surface state of the sandblasted cavity 24 is reflected. That fine asperity pattern has a maximum height roughness Ry of 0.35 to 4.5 μm and a length ratio under load $t_p$ (at a 30% cut level) of 15% or lower.

It is here noted that the support member 32 forming a part of the developing blade 31 further comprises a plurality of holes 33 along the side edge 32B opposite to the side edge 32A, and that the support member 32 forming a part of the developing blade 31 may be the same as the support member 12 forming a part of the aforesaid developing blade 11.

Third Embodiment (Manufacturing Method)

Figure 8:
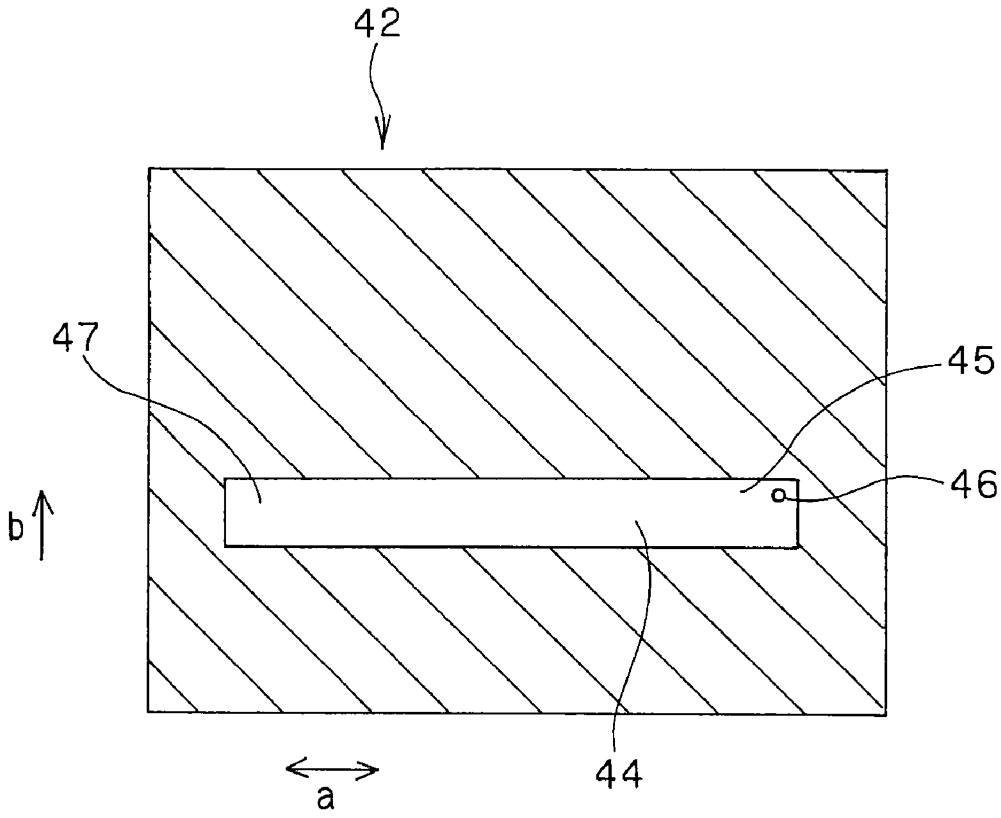
FIG. 8 is a plan view of yet another example of the top mold used with the developing blade manufacturing method according to the invention.

FIG. 8 is a plan view of yet another example of the top mold used with the method of manufacturing the inventive developing blade. In the embodiment shown in FIG. 8, a top mold 42 comprises a cavity 44 for the formation of a blade member, a combined inlet port and reservoir 45 extending in the lengthwise direction (the direction indicated by an arrow a in FIG. 8) of the cavity 44 and formed continuously from the cavity 44 in a direction indicated by an arrow b without any step, and a gate 46 positioned at one end of the combined inlet port and reservoir 45. The site of the combined inlet port and reservoir 45 that is opposite to the side with the gate 46 positioned on it defines a reservoir 47; there is the structure provided in which the inlet port and the reservoir are not independent. In this case, too, the aforesaid cavity 44 is sandblasted with an abrasive in the range of #150 to #1000. This sandblasting may be applied to the combined inlet port and reservoir 45, too. Note here that the site hatched in FIG. 8 stands for a flat mold surface 42A.

As in FIG. 2, such top mold 42 and the aforesaid bottom mold 3 in alignment are clamped together such that the cavity 44 is closed up with a support member. The pressure for clamping together the top mold 42 and the bottom mold 3 may be set in the range of, for instance, 0.5 to 3 MPa per cavity.

Thereafter, the molding material is poured from the gate 46 so that it flows through, and fills in, the cavity 44. And the surface state of the sandblasted cavity 44 is reflected on the molding material filling in the cavity 44, whereby the blade member is formed on the support member, yielding the developing blade. The surface state of the blade member of the ensuing developing blade is going to have a fine asperity pattern on which the surface state of the sandblasted cavity 44 is reflected.

The molding material used herein may be the same as mentioned in conjunction with the aforesaid manufacturing method.

(Developing Blade)

Figure 9:
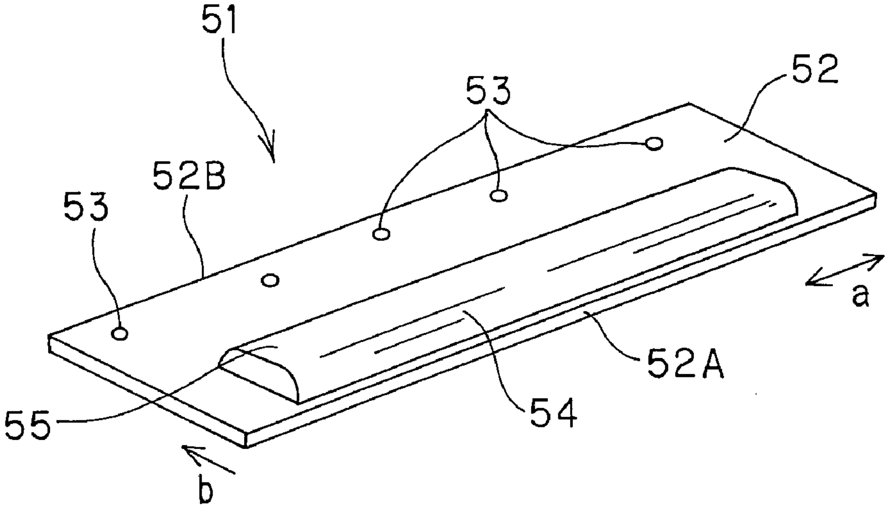
FIG. 9 is a perspective view of yet another embodiment of the developing blade according to the invention.

FIG. 9 is a perspective view of yet another embodiment of the developing blade according to the invention. As shown in FIG. 9, a developing blade 51 comprises a support member 52, a blade member 54 formed along one side edge 52A of the support member 52, and a skirt 55 running in the lengthwise direction (the direction indicated by an arrow a) of the blade member 54. That skirt 55 runs continuously in the widthwise direction of the blade member 54 (the direction indicated by an arrow b) without any step.

The surface shape of the blade member 54 of the developing blade 51 according to the invention is a fine asperity pattern having a maximum height roughness Ry of 0.35 to 4.5 μm, preferably 0.35 to 4.0 μm, and a length ratio under load $t_p$ (at a 30% cut level) of 15% or lower, preferably 12% or lower. With the inventive developing blade 51 comprising such blade member 54, it is possible to hold back an increase in its frictional resistance to the developing roller and allow the toner to be full electrified so that the toner in thin layer form is uniformly carried on the peripheral surface of the developing roller, even when that developing roller rotates at high speeds (of 24 rpm or more, for instance).

The material of the blade member 54 forming a part of the developing blade 51 according to the invention may be the same as that of the blade member 14 forming a part of the aforesaid developing bladed 11.

Such inventive developing blade 51 may be manufactured by the inventive manufacturing method using the aforesaid top mold 42 and bottom mold 3. By manufacturing the developing blade 51 with the aforesaid inventive manufacturing method, the blade member 54 has on its surface a fine asperity pattern on which the surface state of the sandblasted cavity 44 is reflected. That fine asperity pattern has a maximum height roughness Ry of 0.35 to 4.5 μm and a length ratio under load $t_p$ (at a 30% cut level) of 15% or lower.

It is here noted that the support member 52 forming a part of the developing blade 51 further comprises a plurality of holes 53 along the side edge 52B opposite to the side edge 52A. The support member 52 forming a part of the developing blade 51 may be the same as the support member 12 forming a part of the aforesaid developing blade 11.

Fourth Embodiment (Manufacturing Method)

Figure 10A:
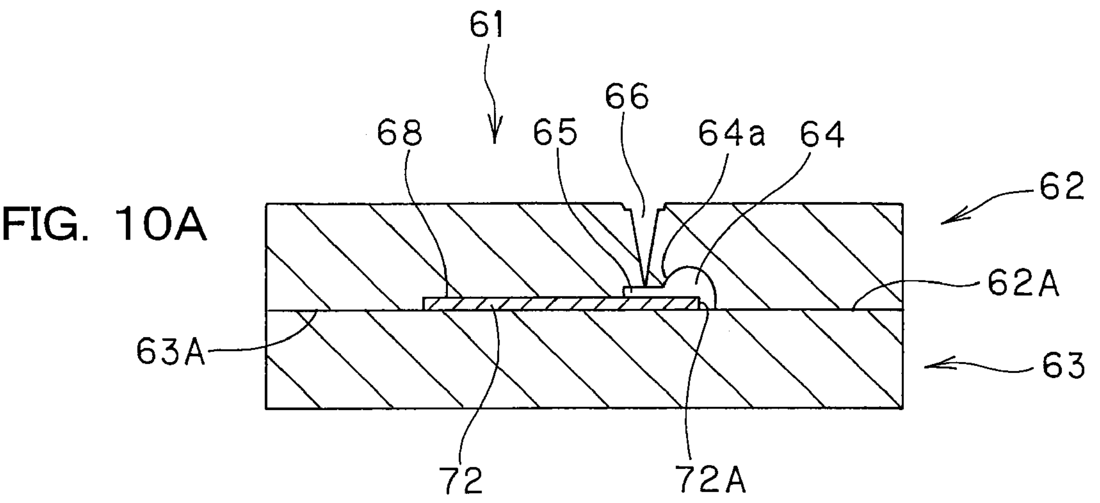
FIGS. 10A, 10B and 10C are illustrative in section, as in FIG. 2, of a further example of the mold assembly used with the developing blade manufacturing method according to the invention.
Figure 10B:
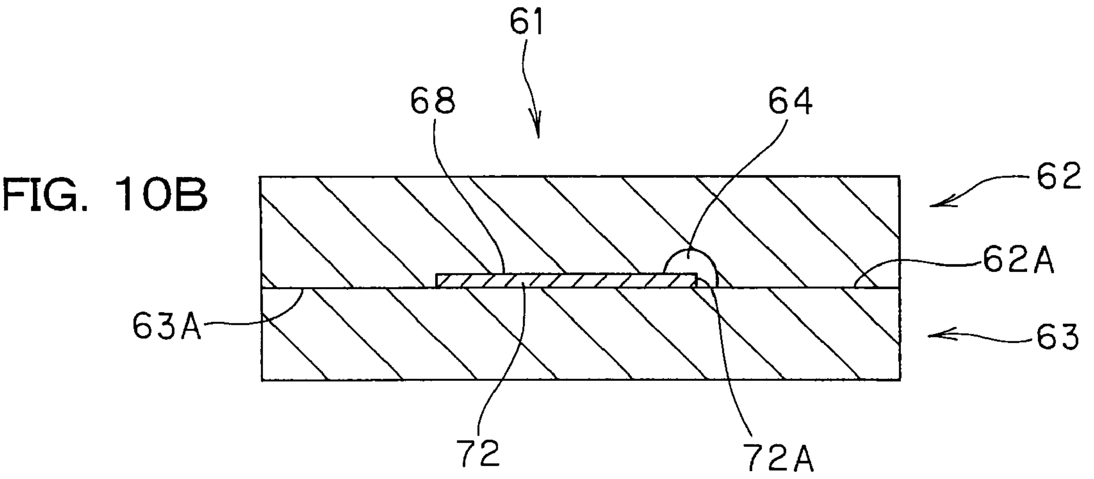
Figure 10C:
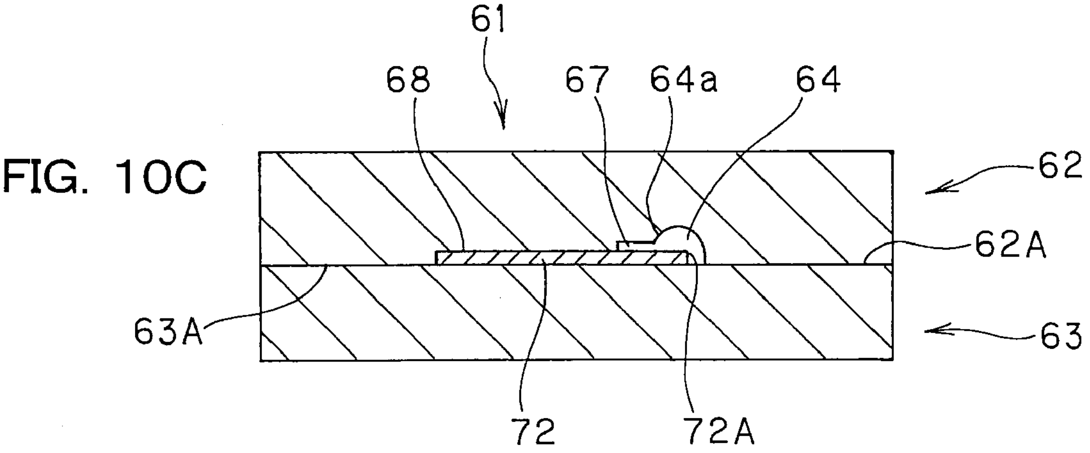

FIG. 10 is illustrative in section, as in FIG. 2, of a further embodiment of the mold assembly used with the inventive developing blade manufacturing method; FIGS. 10A, 10B and 10C are sectional views of the sites of FIG. 1 as taken on lines A-A, B-B and C-C, respectively. A mold assembly 61 shown in FIGS. 10A, 10B and 10C are built up of a top mold 62 and a bottom mold 63. The top mold 62 comprises a mold surface 62A provided with a cavity 64 for the formation of a blade member and a recess 68 into which a support member is to be inserted, an inlet port 65 (see FIG. 10A) provided in a back surface portion 64*a* on one end side of the cavity 64 in the lengthwise direction (the direction coming out of the paper), a gate 66 positioned at the inlet port 65 and a reservoir 67 (see FIG. 10C) provided in the back surface portion 64*a* on the other end side of the cavity 64 in the lengthwise direction. The wall surface of the cavity 64 at the deepest site (the site deepest from the mold surface 62A of the top mold 62) is curved and recessed. The recess 68 for the insertion of the support member is conformed to the shape and thickness of the support member 72 such that one end edge 72A of the support member 72 is positioned at the desired site of the cavity 64. On the other hand, the bottom mold 63 has a flat mold surface 63A. The top mold 62, too, has the cavity 64 sandblasted with an abrasive in the range of #150 to #1000.

It is noted that the inlet port 65 and the reservoir 67 may be reversed in position in the lengthwise direction of the cavity 64, and that the depths, widths (in the lengthwise direction of the cavity 64) and lengths (in the direction orthogonal to the length direction of the cavity 64) of the inlet port 65 and the reservoir 67 may be determined as desired.

As shown, the support member 72 is inserted into the recess 68 to position one end edge 72A of the support member 72 at the cavity 64. In this state, such top mold 62 and bottom mold 63 are clamped together to pour the molding material from the gate 66. The pressure for clamping together the top mold 62 and the bottom mold 63 may be set in the range of, for instance, 0.5 to 3 MPa per cavity. And the surface state of the sandblasted cavity 64 is reflected on the molding material filling in the cavity 64, whereby the blade member is formed on the support member 72, yielding the developing blade. The surface state of the blade member of the ensuing developing blade is going to have a fine asperity pattern on which the surface state of the sandblasted cavity 64 is reflected.

The molding material used herein may be the same as mentioned in conjunction with the aforesaid manufacturing method.

(Developing Blade)

Figure 11:
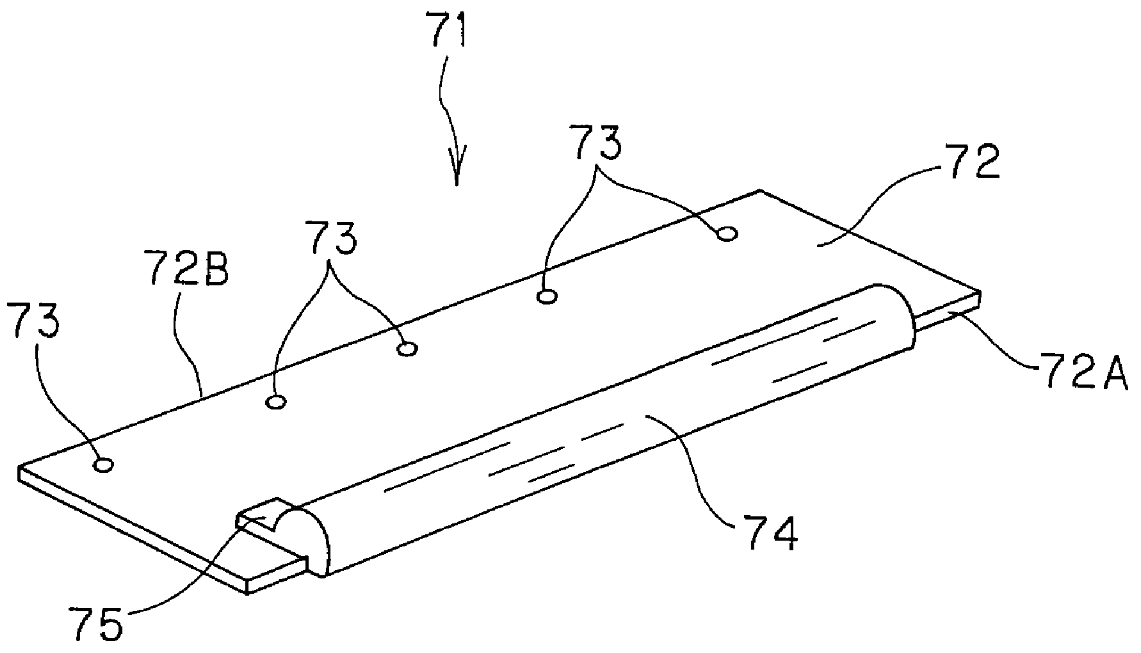
FIG. 11 is a perspective view of a further embodiment of the developing blade according to the invention.

FIG. 11 is a perspective view of a further embodiment of the developing blade according to the invention. As shown in FIG. 11, a developing blade 71 comprises a support member 72, and a blade member 74 formed along one side edge 72A of the support member 72 in such a way as to cover the side edge 72A. The area of contact of that blade member 74 with the developing roller defines a curved surface.

The surface shape of the blade member 74 of the developing blade 71 according to the invention is a fine asperity pattern having a maximum height roughness Ry of 0.35 to 4.5 μm, preferably 0.35 to 4.0 μm, and a length ratio under load $t_p$ (at a 30% cut level) of 15% or lower, preferably 12% or lower. With the inventive developing blade 71 comprising such blade member 74, it is possible to hold back an increase in its frictional resistance to the developing roller and allow the toner to be full electrified so that the toner in thin layer form is uniformly carried on the peripheral surface of the developing roller, even when that developing roller rotates at high speeds (of 24 rpm or more, for instance).

The material of the blade member 74 forming a part of the developing blade 71 according to the invention may be the same as that of the blade member 14 forming a part of the aforesaid developing bladed 11.

Such inventive developing blade 71 may be manufactured by the inventive manufacturing method using the aforesaid top mold 62 and bottom mold 63. By manufacturing the developing blade 71 with the aforesaid inventive manufacturing method, the blade member 74 has on its surface a fine asperity pattern on which the surface state of the sandblasted cavity 64 is reflected. That fine asperity pattern has a maximum height roughness Ry of 0.35 to 4.5 μm and a length ratio under load $t_p$ (at a 30% cut level) of 15% or lower.

It is here noted that the support member 72 forming a part of the developing blade 71 further comprises a plurality of holes 73 along the end edge 72B opposite to the side edge 72A, and that the support member 72 forming a part of the developing blade 71 may be the same as the support member 12 forming a part of the aforesaid developing blade 11.

Fifth Embodiment (Manufacturing Method)

Figure 12A:
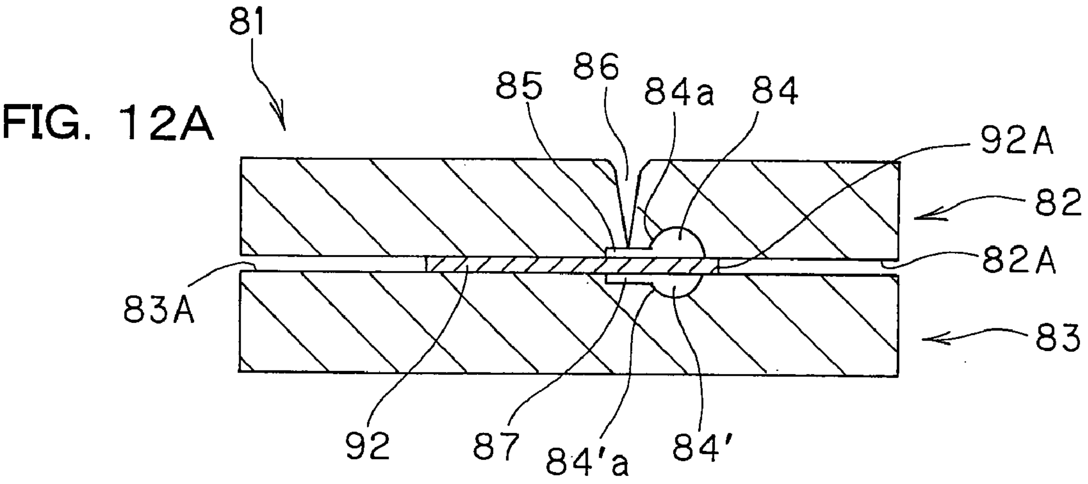
FIGS. 12A, 12B and 12C are illustrative in section, as in FIG. 2, of a further example of the mold assembly used with the developing blade manufacturing method according to the invention.
Figure 12B:
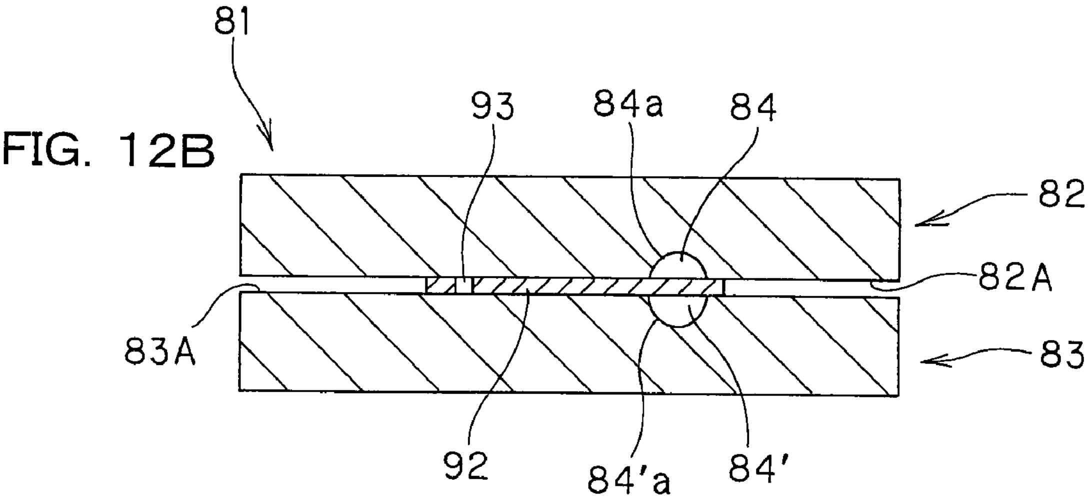
Figure 12C:
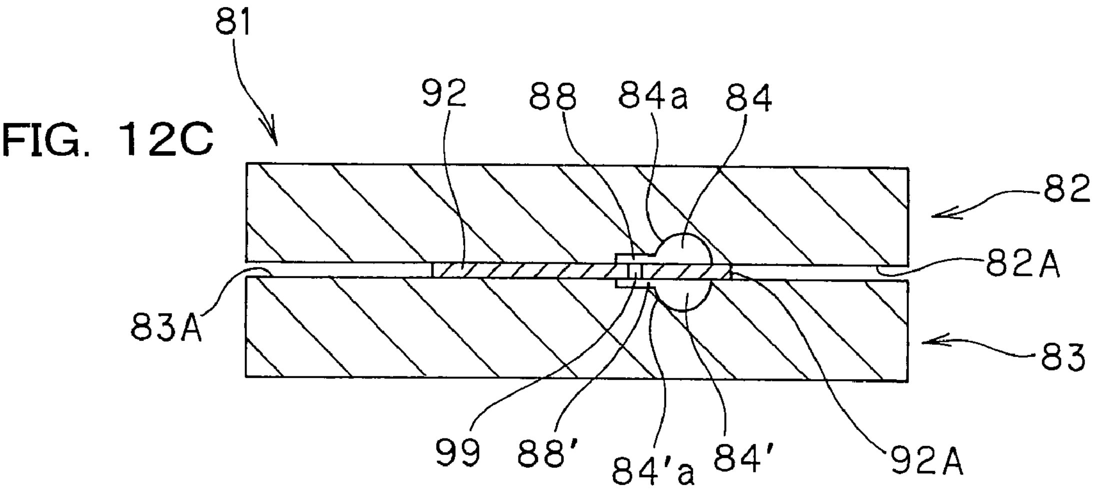

FIG. 12 is illustrative in section, as in FIG. 2, of a further example of the mold assembly used with the inventive developing blade manufacturing method; FIGS. 12A, 12B and 12C are sectional views of the sites corresponding to lines A-A, B-B and C-C of FIG. 1, respectively. A mold assembly 81 shown in FIGS. 12A, 12B and 12C is built up of a top mold 82 and a bottom mold 83.

The top mold 82 comprises a mold surface 82A with a cavity 84 formed for the formation of a blade member, an inlet port 85 (see FIG. 12A) provided in a back surface portion 84*a* near one end of the cavity 84 in the length-wise direction (the direction coming out of the paper), a gate 86 positioned at the inlet port 85 and a communication portion 88 (see FIG. 12C) provided in the back surface portion 84*a* near the other end of the cavity 84 in the lengthwise direction.

Likewise, the bottom mold 83 comprises a mold surface 83A with a cavity 84' formed for the formation of a blade member, a reservoir 87 (see FIG. 12A) provided in a back surface portion 84'*a* near one end of the cavity 84' in the lengthwise direction (the direction coming out of the paper), and a communication portion 88' (see FIG. 12C) provided in the back surface portion 84'*a* near the other end of the cavity 84' in the lengthwise direction.

Such top mold 82 and bottom mold 83, too, have the cavities 84 and 84' sandblasted with an abrasive in the range of #150 to #1000.

And the support member 92 is inserted in such a place that the cavity 84 opposes the cavity 84' with the support member 92 between them, the communication portion 88 opposes the communication portion 88' with the support member 92 between them, and a through-hole 99 in the support member 92 is positioned at a site where the communication portions 88 and 88' oppose each other. In this state, the top mold 82 and the bottom mold 83 are clamped together. Thereafter, the molding material is poured from the gate 86 to fill in the cavities 84 and 84', yielding the developing blade.

Figure 13:
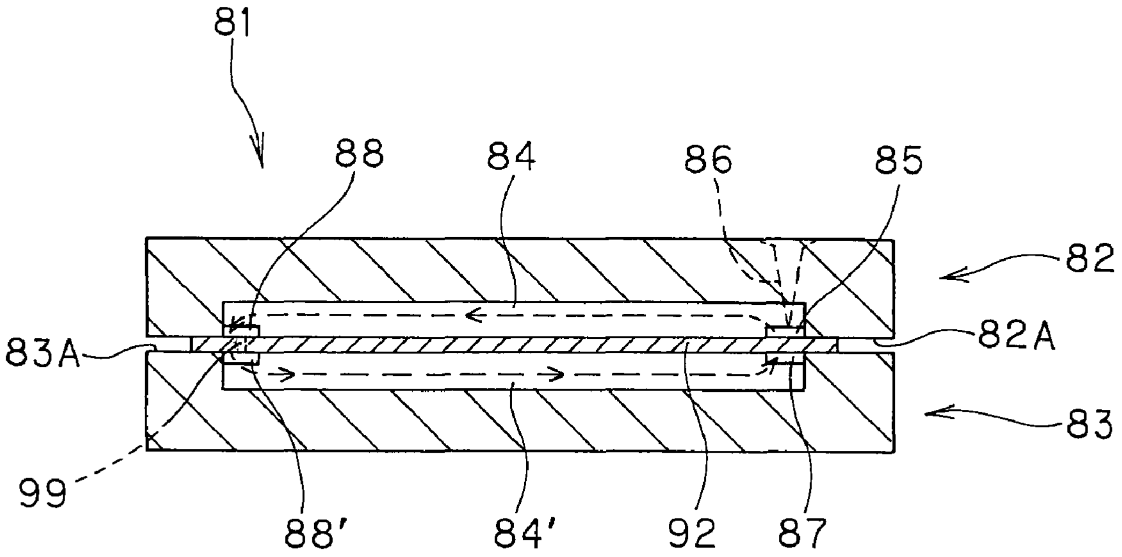
FIG. 13 is illustrative in section of the mold assembly of FIG. 12 being cut along the lengthwise direction of the cavity.

Thus, the molding material poured from the inlet port 85 at which the gate 86 is positioned flows through the cavity 84 in the top mold 82 along a flow line indicated by a chain line in FIG. 13, arriving at the communication portion 88. And, through the through-hole 99 in the support member 92 positioned here, it arrives at the communication portion 88', whence it flows through the cavity 84' in the bottom mold 83, flowing over it and arriving at the reservoir 87. For this reason, the flow of the molding material through the cavities 84, 84' is good enough to prevent the occurrence of sink marks and weld marks, and even when there are air bubbles in the molding material, it is possible to form an intimate blade member of uniform thickness and without air bubbles, because such air bubbles are collected in the overflowing reservoir 87 for degassing.

As noted above, the surface state of the sandblasted cavities 84 and 84' is reflected on the surface of the blade member of the obtained developing blade, making sure a fine asperity pattern.

It is here noted that the molding material used herein may be the same as mentioned in connection with the aforesaid manufacturing method.

(Developing Blade)

FIG. 14 is illustrative of a further embodiment of the developing blade according to the invention; FIG. 14A is a front view and the FIG. 14B a back view. FIG. 15 is a sectional view of the developing blade of FIG. 14 as taken on line A-A. As shown in FIGS. 14 and 15, a developing blade 91 comprises a support member 92, a blade member 94 formed at one surface of the support member 92 along one side edge 92A, and a blade member 94' formed at the other surface.

That blade member 94 is formed along the side edge 92A of the support member 92, with its area of contact with a developing roller defining a curved surface. Further, there is a skirt 95 near one end of the blade member 94 in the lengthwise direction (the direction indicated by an arrow a in FIG. 14), and there is a skirt 98 near the other end.

The blade member 94' is formed along the side edge 92A in such a way as to oppose the blade member 94 with the support member 92 between them, and its area of contact with the developing roller defines a curves surface. Near one end of the blade member 94' in the lengthwise direction (the direction indicated by an arrow a in FIG. 14), there is a skirt 98' formed in such a way as to oppose that skirt 98 with the support member 92 between them. And in the support member 92 at a site where the skirts 98 and 98' oppose each other, there is a through-hole 99 present.

The surface shape of the blade member 94, 94' of such developing blade 91 according to the invention is a fine asperity pattern having a maximum height roughness Ry of 0.35 to 4.5 μm, preferably 0.35 to 4.0 μm, and a length ratio under load $t_p$ (at a 30% cut level) of 15% or lower, preferably 12% or lower. With the inventive developing blade 91 comprising such blade members 94 and 94', it is possible to hold back an increase in its frictional resistance to the developing roller and allow the toner to be full electrified so that the toner in thin layer form is uniformly carried on the peripheral surface of the developing roller, even when that developing roller rotates at high speeds (of 24 rpm or more, for instance).

The support member 92 forming a part of the developing blade 91 further comprises a plurality of holes 93 along the side edge 92B opposite to the side edge 92A. Such holes 93 may optionally be used for mounting, alignment or the like; they are never limited to what is illustrated in the drawings.

It is here noted that the material of the blade member 94, 94' forming a part of the inventive developing blade 91 may be the same as mentioned with reference to the blade member 14 forming a part of the aforesaid developing blade 11.

Sixth Embodiment (Manufacturing Method)

Figure 16A:
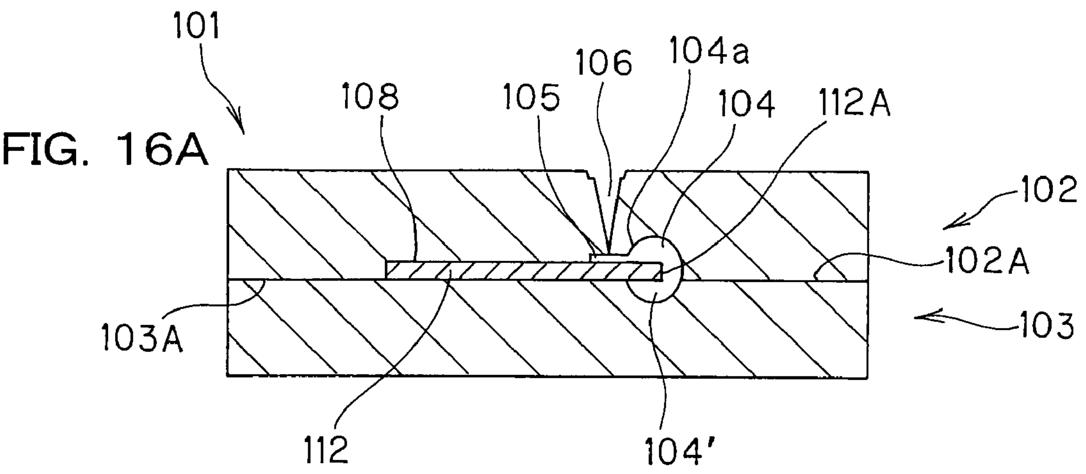
FIGS. 16A, 16B and 16C are illustrative in section, as in FIG. 2, of a further example of the mold assembly used with the developing blade manufacturing method according to the invention.
Figure 16B:
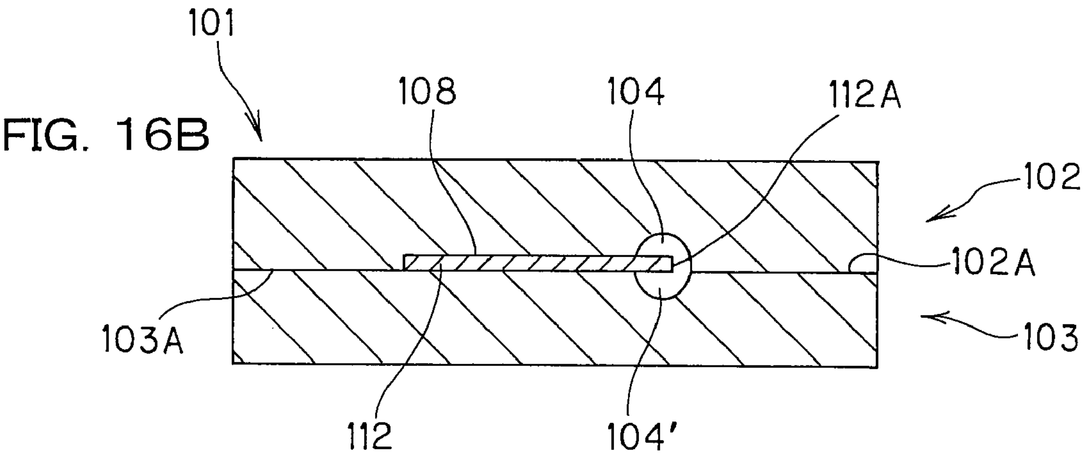
Figure 16C:
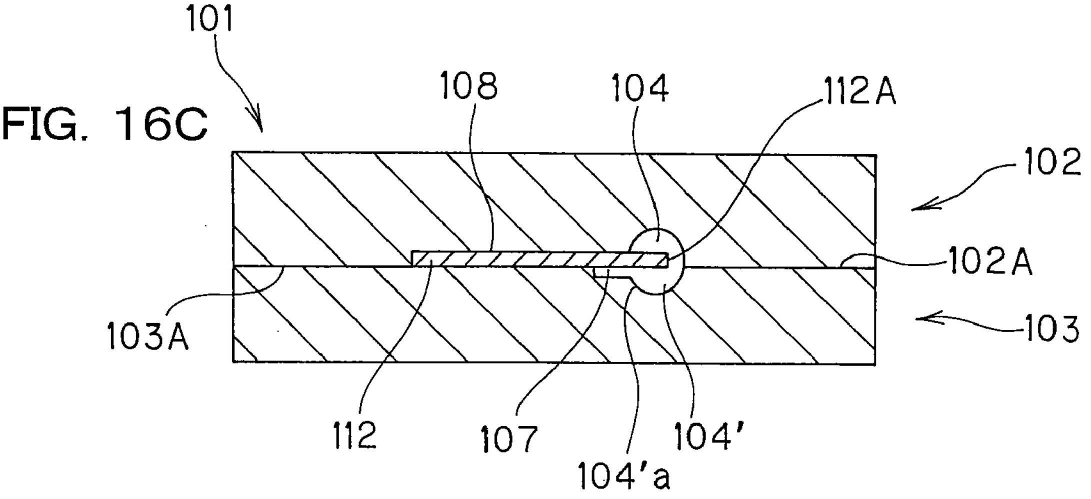

FIG. 16 is illustrative in section, as in FIG. 2, of a further example of the mold assembly used with the inventive developing blade manufacturing method; FIGS. 16A, 16B and 16C are sectional views of the sites corresponding to lines A-A, B-B and C-C of FIG. 1, respectively. A mold assembly 101 shown in FIGS. 16A, 16B and 16C is built up of a top mold 102 and a bottom mold 103.

The top mold 102 comprises a mold surface 102A provided with a cavity 104 for the formation of a blade member and a recess 108 into which the support member is to be inserted, an inlet port 105 (see FIG. 16A) provided in a back surface portion 104$a$ near one end of the cavity 104 in the lengthwise direction (the direction coming out of the paper), and a gate 106 positioned at the inlet port 105.

Likewise, the bottom mold 103 comprises a mold surface 103A with a cavity 104' formed for the formation of a blade member, and a reservoir 107 (see FIG. 16C) provided in a back surface portion 104'$a$ near one end of the cavity 104' in the lengthwise direction (the direction coming out of the paper).

Such top mold 102 and bottom mold 103, too, have the cavities 104 and 104' sandblasted with an abrasive in the range of #150 to #1000.

And while the cavities 104 and 104' are opposite to each other with the support member 112 between them, the support member 112 is inserted into the recess 108 such that the end edge 112A of the support member 112 is positioned in a space where the cavities 104 and 104' oppose each other. In this state, the top mold 102 and the bottom mold 103 in alignment are clamped together. Thereafter, the molding material is poured from the gate 106 to fill in the cavities 104 and 104', yielding the developing blade.

Figure 17:
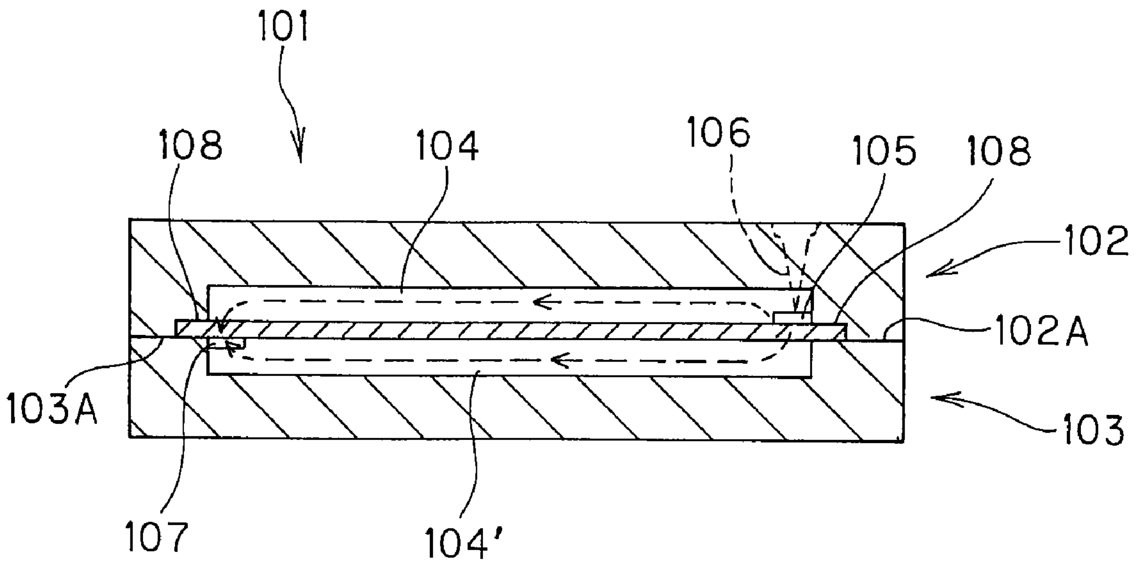
FIG. 17 is illustrative in section of the mold assembly of FIG. 16 being cut along the lengthwise direction of the cavity.
Figure 20:
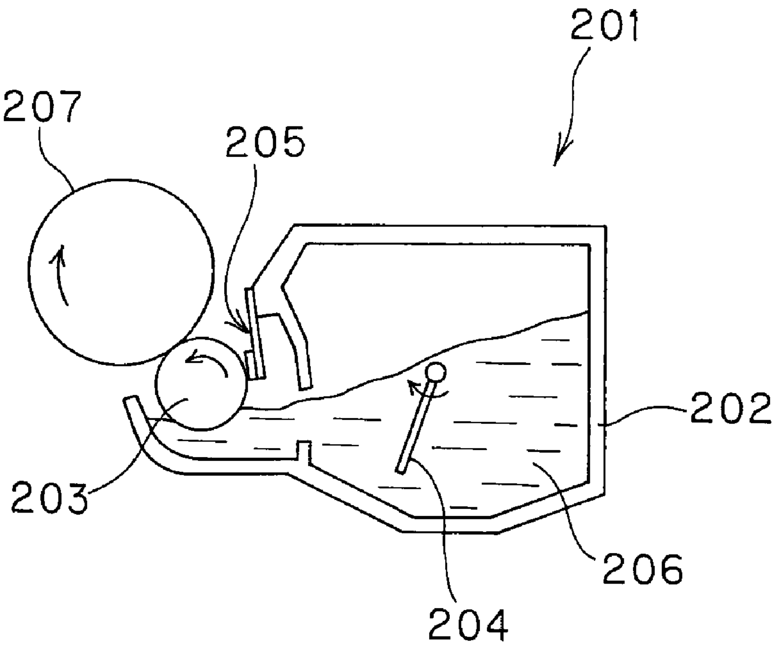
FIG. 20 is illustrative of one example of the structure of the developer equipment.
Figure 21:
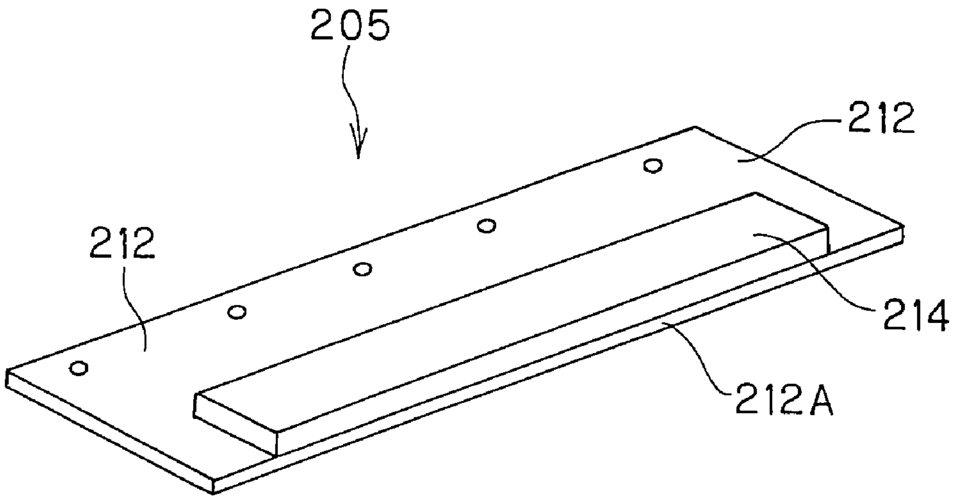
FIG. 21 is illustrative in perspective of one example of the prior art developing blade.

Thus, the molding material poured from the inlet port 105 at which the gate 106 is positioned flows concurrently through the cavity 104 in the top mold 102 and the cavity 104' in the bottom mold 103 along a flow line indicated by a chain line in FIG. 17, flowing over them and arriving at the reservoir 107. For this reason, the flow of the molding material through the cavities 104, 104' is good enough to prevent the occurrence of sink marks and weld marks, and even when there are air bubbles in the molding material, it is possible to form an intimate blade member of uniform thickness and without air bubbles, because such air bubbles are collected in the overflowing reservoir 107 for degassing.

As noted above, the surface state of the sandblasted cavities 104 and 104' is reflected on the surface of the blade member of the obtained developing blade, making sure a fine asperity pattern.

It is here noted that the molding material used herein may be the same as mentioned in connection with the aforesaid manufacturing method.

(Developing Blade)

FIG. 18 is illustrative of a further embodiment of the developing blade according to the invention; FIG. 18A is a front view and the FIG. 18B a back view. FIG. 19 is a sectional view of the developing blade of FIG. 18 as taken on line A-A. As shown in FIGS. 18 and 19, a developing blade 111 comprises a support member 112, a blade member 114 formed at one surface of the support member 112 along one side edge 112A, and a blade member 114' formed at the other surface. Such blade members 114 and 114' are formed in such a way as to cover the side edge 112A. That is to say, at the tip of the developing blade 111 the blade members 114 and 114' are contiguous to each other. The area of contact of the blade member 114, 114' with the developing blade defines a curved surface, and there is a skirt 115 formed near one end of the blade member 114.

The surface shape of the blade member 114, 114' of such developing blade 111 according to the invention is a fine asperity pattern having a maximum height roughness Ry of 0.35 to 4.5 μm, preferably 0.35 to 4.0 μm, and a length ratio under load $t_p$ (at a 30% cut level) of 15% or lower, preferably 12% or lower. With the inventive developing blade 111 comprising such blade members 114 and 114', it is possible to hold back an increase in its frictional resistance to the developing roller and allow the toner to be full electrified so that the toner in thin layer form is uniformly carried on the peripheral surface of the developing roller, even when that developing roller rotates at high speeds (of 24 rpm or more, for instance).

The support member 112 forming a part of the developing blade 111 further comprises a plurality of holes 113 along the side edge 112B opposite to the side edge 112A. Such holes 113 may optionally be used for mounting, alignment or the like; they are never limited to what is illustrated in the drawings.

It is here noted that the material of the blade member 114, 114 forming a part of the inventive developing blade 111 may be the same as mentioned with reference to the blade member 14 forming a part of the aforesaid developing blade 11.

The aforesaid embodiments are provided by way of illustration but not by way of limitation.

The present invention is now explained in more details with reference to specific examples.

A SUS 301 plate of 0.1 mm in thickness, 18 mm in width and 240 mm in length was readied up for the support member, and a liquid silicone rubber/curing agent mixture (LR3303 made by Asahi Kasei Wacker Co., Ltd.) was readied up for the molding material.

With such injection mold assemblies as shown in FIGS. 1 and 2, on the other hand, each cavity was sandblasted with ten abrasives in the range of #80 to #1500 under the following conditions to prepare 10 injection mold assemblies.

(Sandblasting Conditions)

Sandblasting Apparatus: Pressurized Blasting Apparatus (SGF-5 Type made by Fuji Seisakusho Co., Ltd.)

Pressure: 4 $kg/cm^2$

Distance: 100 mm

Angle: 90°

Further, with such injection mold assemblies as shown in FIGS. 1 and 2, each cavity was blasted with four glass abrasives in the range of #80 to #320 under same conditions as mentioned above to prepare four injection mold assemblies.

Then, 14 such injection mold assemblies and the aforesaid support member were used to prepare 14 developing blades (samples 1 to 14).

The blade member of each of the developing blades (samples 1 to 14) prepared in this way was measured for the maximum height roughness Ry and the length ratio under load $t_p$ (at a 30% cut level). The results are set out in Table 1.

(Conditions for Measuring the Maximum Height Roughness Ry)

Measuring Apparatus Surface roughness apparatus (Surfcom 2800E made by Tokyo Seimitsu Co., Ltd.)

(Conditions for Measuring the Length Ratio Under Load $t_p$ (at a 30% Cut Level))

Reference Length: 0.8 mm

Measuring Apparatus Surface roughness apparatus (Surfcom 2800E made by Tokyo Seimitsu Co., Ltd.)

Each of the obtained developing blades (samples 1 to 14) was mounted on a laser printer (HL5240 made by Brother Industries Co., Ltd.) to form images with the rotation speed of the developing roll set at 24 rpm. The thus formed images are observed in terms of density and streaks. The results are set out in Table 1.

TABLE 1

| DB* | Abrasive** | Ry*** | $t_p$**** (%) | Estimation of Image |
|---|---|---|---|---|
| Sample 1 | Sand #1500 | 0.25 | 7 | Streaks |
| Sample 2 | Sand #1200 | 0.29 | 9 | Streaks |
| Sample 3 | Sand #1000 | 0.43 | 7 | Good |
| Sample 4 | Sand #800 | 0.37 | 10 | Good |
| Sample 5 | Sand #600 | 0.39 | 12 | Good |
| Sample 6 | Sand #400 | 0.44 | 7 | Good |
| Sample 7 | Sand #320 | 0.69 | 10 | Good |
| Sample 8 | Sand #150 | 4.41 | 10 | Good |
| Sample 9 | Sand #120 | 7.23 | 12 | Low density |
| Sample 10 | Sand #80 | 11.20 | 7 | Low density + Streaks |
| Sample 11 | Glass #320 | 1.34 | 21 | Streaks |
| Sample 12 | Glass #200 | 2.04 | 23 | Streaks |
| Sample 13 | Glass #100 | 3.03 | 22 | Streaks |
| Sample 14 | Glass #80 | 3.65 | 29 | Streaks |

DB*: Developing Blade
Abrasive**: used for the blasting of the cavity in the mold used
Ry***: Maximum height roughness
$t_p$****: Length ratio under load As set out in Table 1, each of the developing blades (samples 3 to 8) prepared using an injection mold assembly having a cavity sandblasted with an abrasive in the range of #150 to #1000 has a blade member having a maximum height roughness Ry of 0.35 to 4.5 μm and a length ratio under load $t_p$ (at a 30% cut level) of 15% or less, figures indicating that good enough images of sufficient density can be produced out of a high speed type laser printer.

INDUSTRIAL APPLICABILITY

The present invention is applicable to developing blades used on developers in electrophotographic imagers.

What we claim is:

1. A developing blade comprising:

a support member; and a blade member located along one side edge of said support member, wherein said blade member has a surface shape defined by a maximum height roughness Ry of 0.35 to 4.5 μm and a length ratio under load $t_p$ (at a 30% cut level) of 15% or less.

2. The developing blade according to claim 1, wherein said side edge of said support member is covered with said blade member except both ends thereof.

3. The developing blade according to claim 1, wherein said blade member is located on each surface of said support member.

4. A developing blade in a developer having a developing roller, the developing blade comprising:

a support member secured to the developer; and a blade member mounted along one side edge of said support member such that the blade member is adjacent the developing roller, wherein said blade member has a surface shape defined by a maximum height roughness Ry of 0.35 to 4.5 μm and a length ratio under load $t_p$ (at a 30% cut level) of 15% or less.

5. The developing blade according to claim 4, wherein said side edge of said support member is covered with said blade member except both ends thereof.

6. The developing blade according to claim 4, wherein said blade member is located on each surface of said support member.

* * * * *